May 28, 1963 D. R. GREENBERG 3,091,751
COMPUTING DEVICE FOR OPTICAL LANDING SYSTEMS
Filed May 5, 1959 3 Sheets-Sheet 1

INVENTOR.
DAVID R. GREENBERG
BY
ATTORNEY

May 28, 1963     D. R. GREENBERG     3,091,751
COMPUTING DEVICE FOR OPTICAL LANDING SYSTEMS
Filed May 5, 1959     3 Sheets-Sheet 2

INVENTOR.
DAVID R. GREENBERG
BY
*Eli Weiss*
ATTORNEY

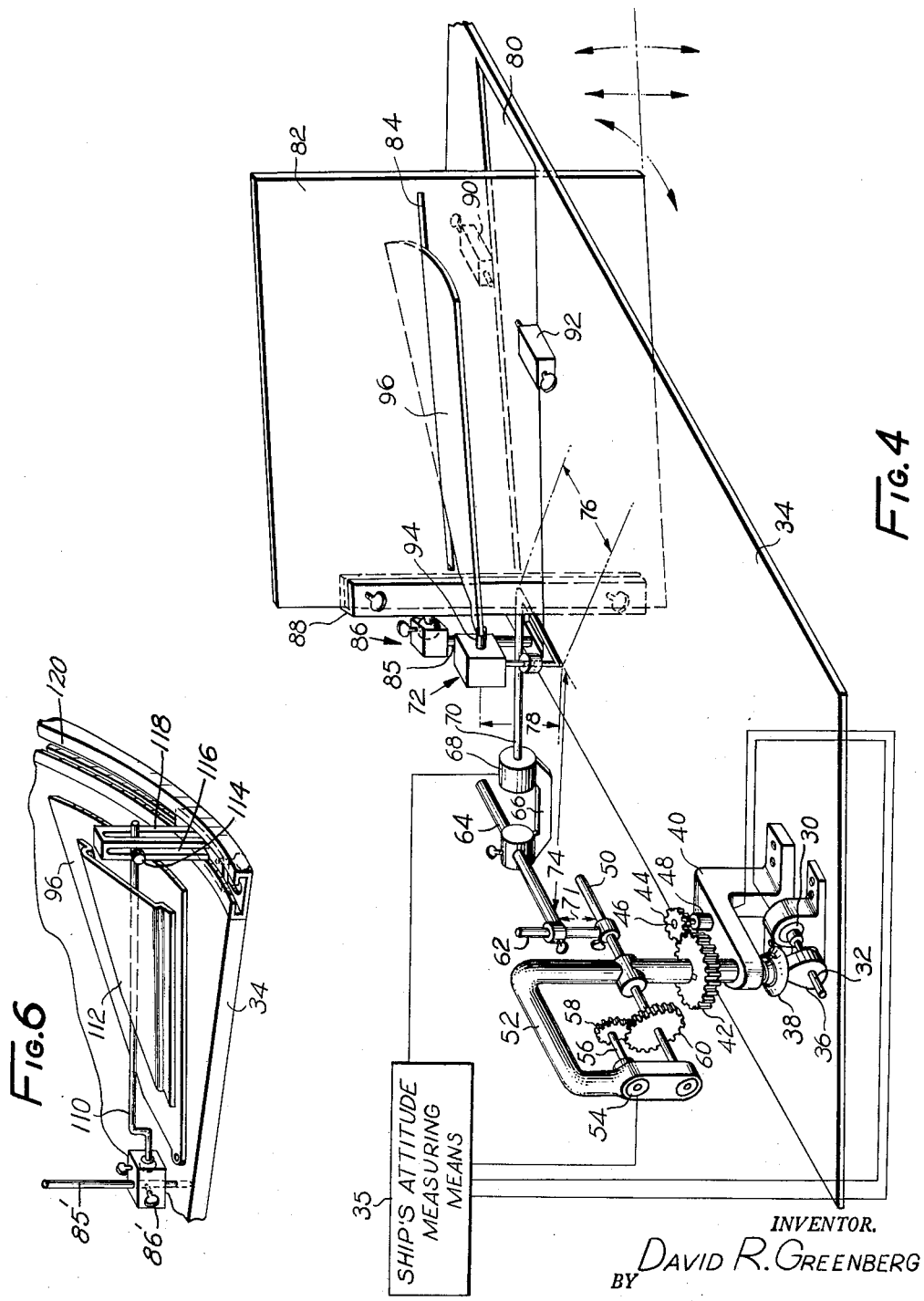

United States Patent Office 3,091,751
Patented May 28, 1963

3,091,751
COMPUTING DEVICE FOR OPTICAL
LANDING SYSTEMS
David R. Greenberg, Bellerose, N.Y., assignor to Burroughs Corporation, Detroit, Mich., a corporation of Michigan
Filed May 5, 1959, Ser. No. 811,164
9 Claims. (Cl. 340—26)

This invention relates generally to a computing device and more particularly to an electromechanical computer network which generates desired corrective reference signals by measuring the differential displacement between the occurring function and the desired function, each represented physically.

In recent years, the problems associated with landing an airplane on the flight deck of an aircraft carrier have become more complex due to the increase in size and speed of modern aircraft. Today, the maintenance of an airplane along a given glide path requires all of a pilot's skill since a relatively small error may create a hazardous landing condition or result in the loss of operational time, a condition which cannot be tolerated with present day tactical methods. The several glide path indicating systems presently in use have proven capable within their limitations.

One of these systems—the Fresnel Lens Optical Landing System, and the other system—the Mirror Deck Optical Landing System, furnish a visual aid to the pilot of an incoming airplane to establish the proper glide angle to the deck of an aircraft carrier. Each of these devices is primarily an electro-optical system installed along the flight deck of the carrier to provide a bar of light that indicates to the pilot his position relative to the correct landing path.

Each system is stabilized against the ship's roll and pitch by the utilization of signals from the ship's stable element—not to establish a fixed glide path, but to constrain a point on the indicated landing path or glide path located 2500 feet aft of the carrier ramp to an assigned position in space regardless of roll or pitch of the ship.

In practice, the Fresnel Lens Optical Landing System and the Mirror Deck Optical Landing System, each hereafter referred to as the optical landing device, operate in essentially the same manner. The pitch stabilization system presently in use compensates for the vertical motion of the lens box of the Fresnel System, or the mirror of the Mirror Deck System to compensate for the movement of the ship caused by pitch alone to fix in space the viewing area in a flat plane 2,500 feet aft of the ship.

The roll stabilization system presently in use compensates for the vertical component of the displacement of the viewing area in space caused by ship's roll. Thus, the indicated glide path consists of a theoretical line in space extending from the stabilized point positioned 2,500 feet aft of the ship to the touchdown point on the flight deck of the carrier, and is moving in space with the ship's roll and pitch. The indicated glide path is constrained at only one point—2,500 feet aft of the aircraft carrier, a relatively simple accomplishment when compared to the fixing of the entire glide path, not just one point, in space.

The condition that a point on the indicated glide path be stationary at a distance of 2500 feet aft of the carrier ramp is necessary for the acquisition phase of the landing operation. Without the presence of this one stable point on the indicated glide path the pilot of an approaching airplane would experience great difficulty in attempting to locate the indicated glide path. Unfortunately, however, the angle of the light beam with respect to the ship will be changing constantly with changes in the roll and the pitch of the vessel.

A major disadvantage presently encountered is that the position of the indicated glide path varies with each change in the roll and pitch of the carrier, this variation increasing in magnitude as the pilot approaches the carrier. For example, if the indicated glide path moves downward as the pilot approaches the aircraft carrier he cannot tell whether the indicated glide path is being driven downward as a result of the pitching action of the ship, or if he is flying along an undesired path and must be reoriented to remain on the desired glide path.

Obviously, it is extremely difficult, and sometimes hazardous to orient an airplane along an optical glide path which is moving in space; particularly when the pilot is not certain of whether his airplane is rising relative to the optical glide path, or the optical glide path is falling relative to his airplane.

Computer networks have been designed to stabilize the indicated glide path in space, however, they are extremely complicated, require delicate structure, and occupy a relatively large cabinet having demensions of approximately 18 inches by 18 inches by 60 inches. Obviously, the structure is very heavy, expensive to build, and very susceptible to breakdown because of the multiplicity of components required. Unfortunately, this structure is also very rigid in design—it being virtually impossible to quickly and easily condition a computer from one ship to operate on another ship having different physical or operating characteristics; or to quickly and easily condition a computer on any one particular ship to present a new glide path, or a different distance between the hook of the airplane to the eye of the pilot to accommodate different types of airplanes. Obviously, the angle of the flight deck relative to the center line or reference plane of the carrier is an important factor which must be considered in the design of the computer. It is this angle which adds considerably to the design problems of the computer.

It is a primary object of this invention to provide an improved computer network to generate corrective signals fed to stabilize fully in space a beam of light from an optical aircraft landing device along a predetermined path to indicate a desired glide path.

It is another object of this invention to provide an improved computer network which can be selectively conditioned easily and quickly to provide corrective signals fed to stabilize fully a beam of light from an optical aircraft landing aid along one of a number of desirable glide paths.

It is still another object of this invention to provide an improved computer network which can be selectively conditioned, easily and quickly, to provide corrective signals fed to stabilize fully a beam of light from an optical aircraft landing aid so as to compensate for a desired one of a number of hook to eye distances existing among the various types of airplanes utilized.

It is still another object of this invention to provide an improved computer network which can be selectively conditioned easily and quickly to provide corrective signals fed to stabilize fully a beam of light from an optical aircraft landing aid to compensate for a desired angled landing deck.

It is also an object of this invention to provide an improved computer network which can be selectively conditioned easily and quickly to operate from one of a desired number of vessels having different operating characteristics to provide corrective signals fed to stabilize fully a beam of light from an optical aircraft landing aid along a predetermined path to indicate the desired stabilized glide path from the desired vessel.

It is a further object of this invention to provide an improved computer network which is small in size and light in weight.

It is an additional object of this invention to provide an improved computer network which is very reliable in operation and extremely economical to build.

Other objects and many of the attendant advantages of this invention will be readily appreciated as the apparatus becomes better understood by reference to the following detailed description when considered in connection with the accompaning drawings wherein:

FIG. 4 illustrates structure in accordance with the principles of this invention;

FIG. 6 is a modified form of structure in accordance with the principles of this invention.

Similar reference characters refer to similar parts throughout the several views of the drawings.

Briefly, a reference plane or a base plate which can be considered to represent the earth's surface supports bars, shafts or the like positioned relative to each other to present a physical display in scale model form of the actual roll and pitch axes of a particular vessel. Servo motors or the like coupled to these bars or shafts reproduce the roll, pitch, yaw, and heave displacements of the vessel. A driven member oriented by the servo motors acting through the shafts or rods assumes the same position relative to the base plate that an actual optical landing device mounted adjacent to the vessel's flight deck assumes relative to the surface of the earth. A first rigid member supported by the base plate defines the desired glide path. A second rigid member represents the beam of light from the actual optical landing device and is supported by the first member to assume continuously the desired glide path. Differential measuring means interposed between the second rigid member and the driven member have two degrees of freedom of rotation. One degree of freedom of rotation represents strip pitch (rotation of optical landing device about an axis through its optical center, perpendicular to a line down the center of the landing strip and parallel to the plane of the desk); and the other degree of freedom represents strip roll (rotation of optical landing device about an axis through its optical center and at right angles to the strip pitch axis and also parallel to the plane of the deck). The differential measuring means (one for each degree of freedom of the actual optical landing device) indicates electrically the difference between the orientation of the actual optical landing device due to the ship's displacement, and the position desired for the beam of light. This difference is the strip pitch and strip roll, the actual displacement through which the actual optical landing device must be driven to present a beam of light fixed in space, a stabilized glide path.

Thus, the driven member is driven to assume the same orientation that must be assumed by the actual optical landing device as a result of the vessel's displacements; and the two planes define the display that is desired from the actual optical landing device. The displacement of the plane fixed to occupy the position desired for the beam of light from the optical landing device relative to the miniaturized optical landing device, as measured by the measuring means, indicates the displacement through which the actual optical landing device must be driven to present a fully stabilized glide path.

Figure 1:
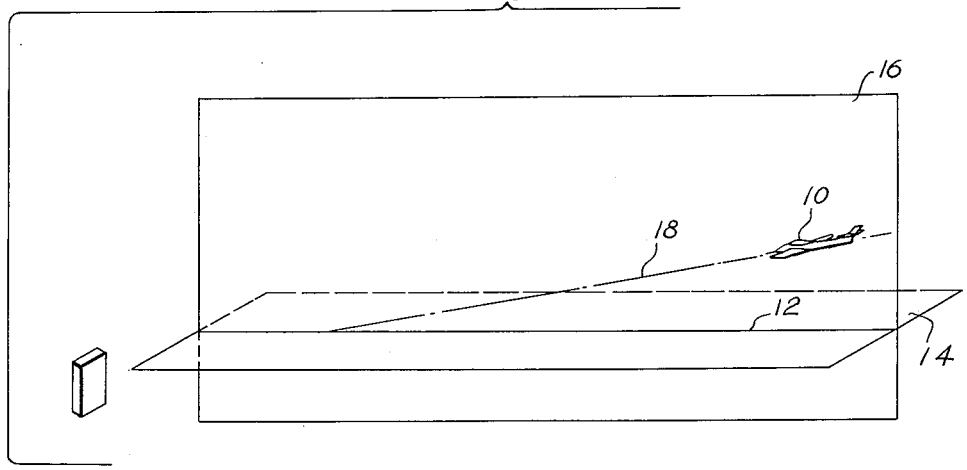
FIG. 1 illustrates pictorially a view of an airplane oriented relative to a vertical and horizontal plane surface during a landing approach along a desired glide path.

With reference to FIG. 1, in landing an airplane 10 on the flight deck 14 of an aircraft carrier the pilot first aligns his airplane visually with a line 12 which extends centrally along the length of the landing strip. In this manner the pilot positions his airplane within a plane 16 which is perpendicular to the surface of the earth and intersects the plane of the flight deck on the landing surface 14 along the center line 12. The pilot then orients his airplane downward at an angle to assume the appropriate glide path indicated by the line 18 to land on the landing surface 14.

Figure 2:
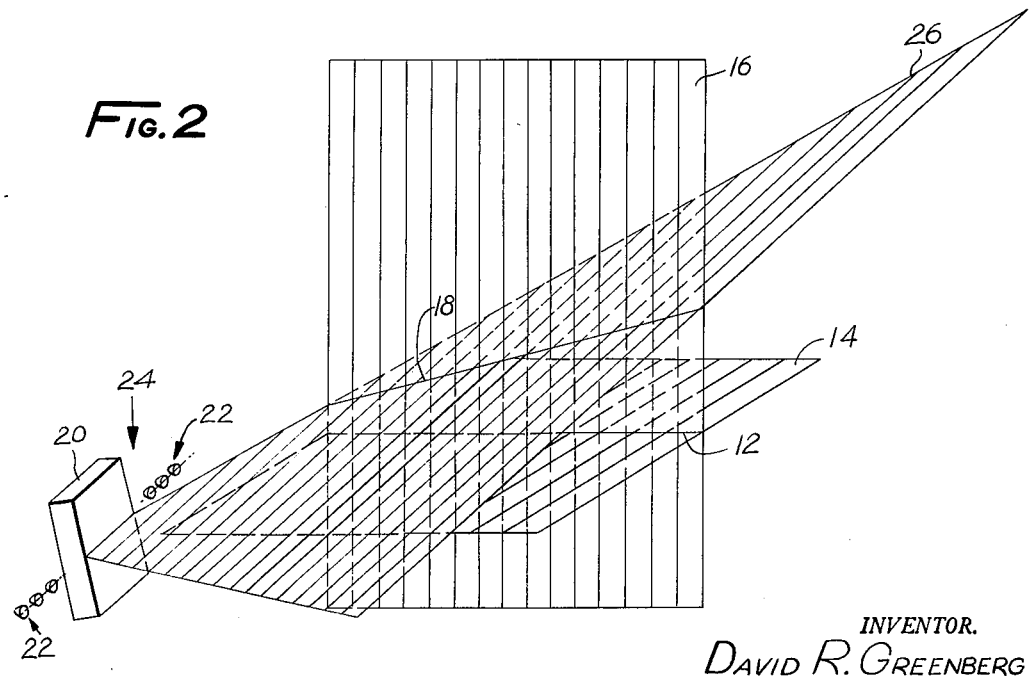
FIG. 2 illustrates pictorially the generation of the desired glide path followed by the airplane of FIG. 1 when landing on the angled deck of an aircraft carrier where the optical landing device is positioned adjacent to a side edge of the landing area.

Presently, optical landing systems are being utilized to optically present the desired glide path 18 to the pilot of an approaching airplane to reduce greatly the hazards associated with the landing of an airplane. With reference to FIG. 2, there is illustrated, pictorially, an optical landing device positioned adjacent to a side edge of a landing area to generate the desired glide path 18 which is followed by the airplane 10 of FIG. 1 when landing on the flight deck of an aircraft carrier.

The optical landing device 24 consists of a lens box or mirror 20 positioned adjacent to a side of the landing area 14, and oriented to display a relatively thin bar shaped pattern of light visible over a wide angle in azimuth and oriented to intercept the plane 16 along the desired glide path line 18. A horizontal row of lights 22 centrally interrupted by the lens box or mirror functions as a reference line. When utilizing the optical landing device, a pilot first positions his airplane in the vertical plane 16 by aligning his airplane with the center line 12 on the carrier deck. Now the pilot merely looks at the optical landing device 24 to position his airplane along the desired glide path 18. If he is higher than the desired glide path, then he will see a bar of light displaced vertically above the reference lights; and conversely, if he is lower than the desired glide path he will see a bar of light displaced vertically below the reference lights. When the plane is positioned along the desired glide path as it approaches the landing area the pilot will see a bar of light aligned with the interrupted row of reference lights 22.

Thus, when utilizing an optical landing device, a pilot merely aligns his airplane with the center line of the landing area or runway, and then looks at the optical landing device to obtain a continuous indication to orient his airplane along the desired glide path.

The light which emanates from the optical landing device can be assumed to be fan shaped, and is represented by the plane surface 26. The line intersection 18 of the plane surface 26 with the plane surface 16 represents the desired glide path. If this line of intersection 18 can be conditioned to remain fixed in space, then this will constitute a stabilized optical glide path.

Under ordinary cirmustances it would not be a difficult problem to orient the optical landing device to present a stable desired glide path in space. However, extremely complicated mathematical computations must be performed when the optical landing device is subjected continuously to undesirable displacement caused by pitch, roll, yaw, and heave of the landing platform; complicated further by the fact that the landing area is not aligned with, but is angled relative to the axes of roll, and pitch; and complicated still further by the fact that different airplanes require different glide angles; and complicated also by the fact that a point on the glide path must be stabilized at a distance of 2500 feet aft of the carrier to permit the pilot of an approaching airplane to "find" the beam.

Figure 3:
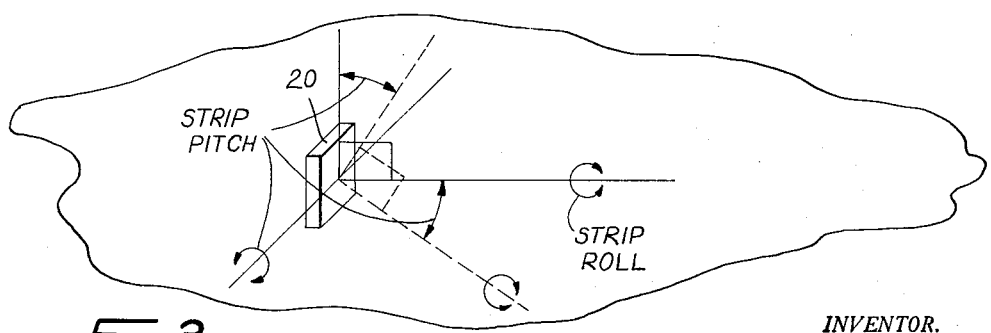
FIG. 3 illustrates graphically strip roll and strip pitch displacements.

The optical landing device positioned adjacent to the side edge of the flight deck of an aircraft carrier has two degrees of freedom of motion. With reference to FIG. 3, rotation of the unit 20 (FIG. 2) about an axis through its optical center, perpendicular to a line down the center of the landing strip and parallel to the plane of the deck will hereafter be referred to as strip pitch; and rotation of the unit 20 about an axis through its optical center and at right angles to the strip pitch axis and also parallel to the plane of the deck of the carrier will hereafter be referred to as strip roll.

In this invention all the actual roll, pitch, yaw, and heave motions experienced by the optical landing device mounted on the ship are accurately reproduced; the desired glide path is physically reproduced; and the differential displacements between the two are measured and fed to the actual optical landing device to present a fully stabilized glide path indication.

The measuring means generates two signals, one indicates the additional strip pitch displacement, and the other indicates the additional strip roll displacement through which the optical landing device must be driven to present continuously a stabilized glide path.

With reference to FIG. 4, there is illustrated structure in accordance with the principles of this invention. A heave follow-up drive means 30 such as a servo motor or the like supports a rotatable shaft 32 and is coupled rigidly by screws, bolts, or the like to a mounting plate or base plate 34. The base plate 34 is the scale representation of the earth's surface. The heave follow-up drive means 30 is fed electrically by the ship's heave indicating structure mounted in the ship's attitude measuring means 35. A cam 36 is coupled rigidly to the rotatable shaft 32 by pins, set screws or the like. The ship's heave indicating structure indicates electrically the vertical displacement of the ship, and feeds an appropriate signal to the follow-up drive means 30 which drives the cam 36 through an appropriate angle to drive the cam follower 38 through a vertical distance proportional to the true vertical displacement, or heave of the ship. The cam follower 38 is slidably supported by a bracket 40 coupled rigidly to the base plate 34 by screws, bolts, or the like. A ship's yaw positioning gear 42 coupled rigidly to the cam follower 38 by pins, set screws, or the like is positioned to engage a ship's yaw drive gear 44 secured rigidly by pins, set screws, or the like to a shaft 46 of the ship's yaw follow-up drive means 48 such as a servo motor or the like. The yaw follow-up drive means 48 is fed electrically by the ship's yaw indicating structure mounted in the ship's attitude measuring means 35 which indicates electrically the deviation of the ship from a straight course in steering.

Thus, the profile of the cam 36 is designed to displace vertically the cam follower 38 a distance proportional to the actual heave displacement of the ship relative to the surface of the earth, and an angular displacement of the cam follower 38 is proportional to the yaw of the ship relative to a straight course in steering.

A shaft 50 rotatably supported by the cam follower 38 represents the ship's pitch axis. A bracket 52 coupled rigidly to the cam follower 38 supports a pitch follow-up drive means 54 such as a servo motor or the like and fed electrically by the ship's pitch indicating structure mounted in the ship's attitude measuring means 35. A rotatable shaft 56 of the pitch follow-up drive means 54 is coupled rigidly to a pitch drive gear 58 by pins, lock screws, or the like. The pitch drive gear 58 is positioned to engage a pitch shaft positioning gear 60 fixed rigidly to the shaft 50 by pins, set screws, or the like. The ship's pitch indicating structure indicates electrically the downward and upward motion of the bow of the ship relative to the earth's surface.

A coupling shaft 62 is selectively positioned along and locked perpendicular to shaft 50 by means of set screws. A shaft 64 is supported parallel to the shaft 50 by the coupling shaft 62. The shaft 64 can be positioned selectively along coupling shaft 62, and locked in position by a set screw to preset the distance between the parallel shafts 50 and 64. This distance is proportional to the vertical distance between the pitch axis and the roll axis of the particular vessel.

A bracket 66 coupled rigidly to shaft 64 by means of a set screw, or the like supports a roll follow-up drive means 68 such as a servo motor or the like fed electrically by the ship's roll indicating structure mounted in the ship's attitude measuring means 35. The shaft 70 of the roll follow-up drive means 68 is coupled to a member 72 which represents the optical landing device 20. The ship's roll indicating structure indicates electrically the angular displacement of the ship about its longitudinal axis.

In aircraft carriers, the roll axis is generally located above the pitch axis. Therefore, the shaft 70 which represents the roll axis is positioned above the shaft 50, which represents the pitch axis, by a distance proportional to the actual distance that the ship's roll axis is displaced above the ship's pitch axis.

From the foregoing it can be seen that the structure disclosed is essentially an operational scale model of the actual vessel on which it is used. Thus, when this structure is first constructed, a convenient scale of size must be selected. In practice a scale of one inch equal fifty feet was found to be acceptable, however, it is to be understood that any convenient scale, whether it be larger or smaller than fifty to one can be used with success.

The shaft 64 is first adjusted to preset the roll axis shaft 70 to the scale distance above the pitch axis shaft 50. This distance is represented by the length 71. The shaft 70 is then adjusted to accurately position the member 72 which represents the optical landing device 24 to assume the same relative position that the actual optical landing device 24 occupies relative to the various axes of the vessel. This position is represented by the lengths 74, 76 and 78. The length 74 is preset in accordance with the scale chosen to equal the exact distance that the optical landing device 24 is positioned aft (or forward) of the ship's pitch axis; the length 76 is preset, in accordance with the scale chosen, to equal the exact distance that the optical landing device 24 is positioned to the left or right (in this instance—to the left) of the ship's roll axis; and the length 78 is preset, in accordance with the scale chosen, to equal the exact distance that the optical landing device 24 is positioned above the ship's roll axis.

The vertical displacement of the cam follower 38 is proportional to the ship's heave, the scale being the same as that chosen for the positioning of the member 72; the angular displacement of the cam follower 38, driven by the yaw follow-up drive means 48 is equal to the ship's yaw; the angular displacement of the shaft 50, and, therefore, 64, driven by the pitch follow-up drive means 54 is equal to the ship's pitch; and the angular displacement of the shaft 70 driven by the roll follow-up drive means 68 is equal to the ship's roll. In this manner the member 72 is driven to the exact orientation, relative to the base plate 34 that the actual optical landing device 24 assumes relative to the earth due to ship's roll, pitch, yaw, and heave. Thus, the drive means positions the member 72 to assume the displacements experienced by the ship's deck or unstable platform, and therefore, by the optical landing device 24.

Proceeding further, the base plate 34 supports a cutout area 80. A vertical member 82 positioned within the cutout area 80 supports a slot cutout 84 which physically represents the airplane glide path. This intersection of the vertical member 82 with the base plate 34 (through the cutout area 80) represents physically the center line which extends along the length of the flight deck. A holding or adjusting means positions and maintains the vertical member and, therefore, the slot cutout 84 in a preselected position relative to the base plate 34 and to the member 72 which represents the optical landing device. In this manner the slot cutout 84 can be positioned to assume an optimum glide path.

A support bar 85 secured rigidly to the base plate 34 is connected through a ball and socket arrangement 86 to a channel member 88. The channel member slidably supports the vertical member 82. Set screws are utilized to lock the ball and socket arrangement 86, and the vertical member 82 to the channel member 88 to orient and lock the slot cutout 84 to the position desired.

Additional locking members 90, 92 positioned adjacent to the cutout area 80 provide additional rigidity to the positioned vertical member 82. The ball and socket arrangement 86 functions as a glide path elevation angle adjusting means; and also as a glide path azimuth angle adjusting means. The vertical member 82 functions as a glide path height adjusting means.

The ball and socket arrangement 86 in combination with the channel member 88 permits the vertical member 82 to have three degrees of freedom. The first degree of freedom, the vertical tilting of the vertical member 82 about the ball and socket arrangement 86 orients the slot cutout 84 to assume the correct airplane glide path elevation angle. The second degree of freedom, the horizontal tilting of the vertical member 82 about the ball and socket arrangement 86 orients the slot cutout 84 to assume the same angle that the carrier flight deck assumes with the carrier roll axis, the latter serving as the reference plane. This angle is referred to as the glide path azimuth angle. The third degree of freedom, the vertical displacement of the vertical member 82 relative to the channel member 88 orients the slot cutout 84 to correct the variations in hook to eye distances of different types of airplanes. This displacement is referred to as the glide path height and positions the airplane relative to the flight deck to permit the airplane landing hook to contact the carrier deck in a predetermined area to insure its engagement with a retarding cable.

When utilizing an optical landing device to land an airplane on the flight deck of a carrier, the pilot flies his airplane along an optical glide path—a path which he sees. Thus, for any particular glide path the eye level of the pilot of each airplane, regardless of size or type, will always travel along the same path. However, the distance between the pilot's eyes and the tail hook of a small fighter plane (referred to as the hook to eye distance) is smaller than the hook to eye distance of a bomber. Therefore, unless corrections are made the small fighter plane can overshoot the runway; or the bomber can come in too short and crash into the carrier. Obviously, to present an optimum glide path correction must be made to compensate for various hook to eye distances. The third degree of freedom compensates for variations in hook to eye distances of various airplanes to enable each to land safely on the deck of a carrier.

A shaft 94 extending outward from the member 72 supports a fan shape rigid member 96 which represents the beam of light emanating from the actual optical landing device 24 positioned on the flight deck of the carrier. The fan shaped rigid member 96 is positioned within and slidably supported by the slot cutout 84 in the vertical member 82.

The slot cutout 84 physically presents the glide path desired. Therefore, by utilizing the slot cutout 84 to define the position of the fan shaped rigid member 96, the rigid member 96 will always occupy a fixed desired position regardless of the gyrations of the member 72 caused by the ship's roll, pitch, yaw, and heave movements. Thus, the member 96 assumes continuously the position desired for the beam of light from the optical landing device.

Figure 5:
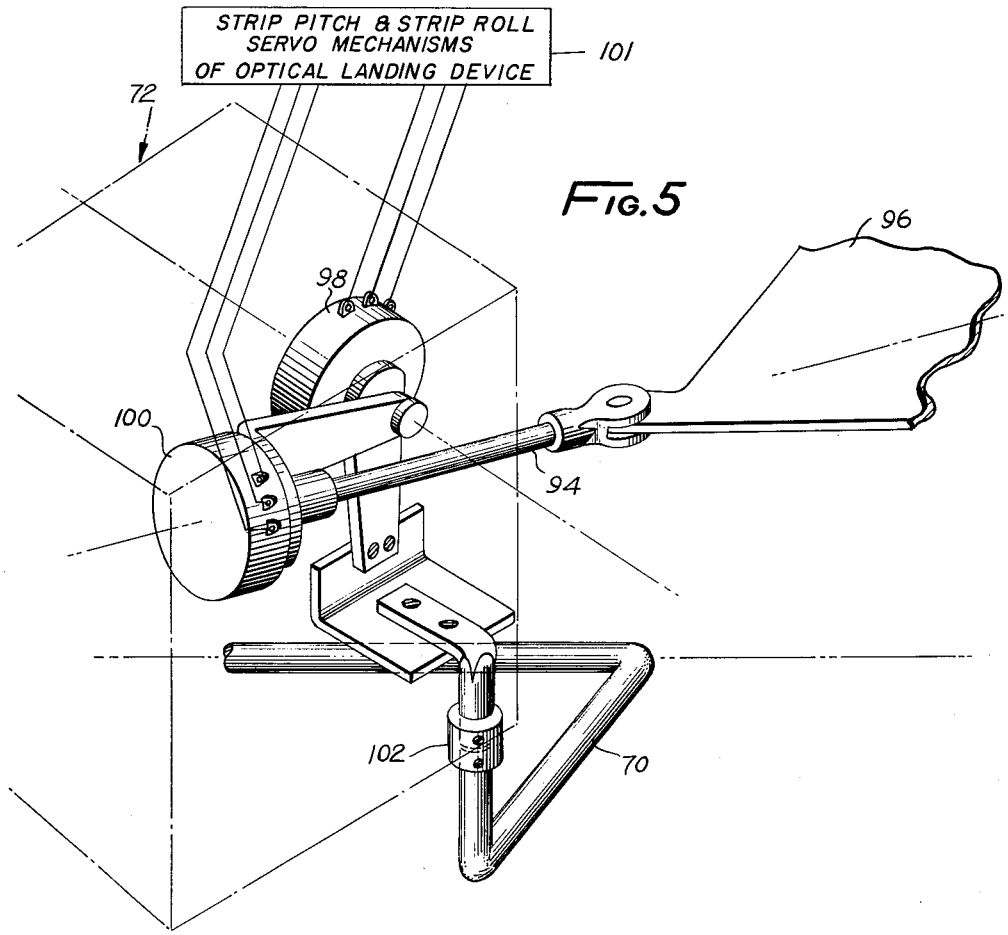
FIG. 5 illustrates in detail the corrective signal generating structure.

The shaft 94 is coupled to the member 72 through a gimbal arrangement having differential measuring means or two transducers 98, 100 which permits two degrees of freedom. The transducers can by any structure which will generate a signal proportional to displacement such as potentiometers, synchro transmitters, variable transformers, and the like. This structure is shown more fully in FIG. 5. The transducers generate electrical potential signals to indicate the instantaneous differential displacement between the member 72, which assumes the attitude of the optical landing device due to displacements of the ship; and the fan shaped rigid member 96, which represents the beam of light which emanates from the actual optical landing device when oriented to define a fixed desired position in space.

Therefore, since the member 72 assumes continuously the exact orientation assumed by the actual optical landing device 24 caused by the various displacements of the vessel, and the fan shaped rigid member 96 assumes continuously the desired glide path in space, then the additional corrective displacement required by the actual optical landing device to present continuously a stabilized glide path in space can be determined by measuring the displacement of the member 72 or miniaturized optical landing device relative to the fan shaped rigid member.

The transducers generate signals proportional to actual strip pitch and strip roll through which the optical landing device must be driven to maintain a stabilized glide path in space. These electrical signals are utilized to drive the actual strip pitch and strip roll servo mechanisms 101 on the optical landing device 24 to position continuously the optical landing device relative to the deck surface on which it is mounted to present a stabilized optical glide path in space.

A coupling member 102 is provided to permit the member 72 which represents the optical landing device to be oriented relative to the vertical plane 82 as the actual optical landing device is oriented relative to the center line of the landing area.

Thus, this invention discloses a computer which can be used successfully with any type of optical landing device such as the Fresnel lens type, or the reflecting (mirror) type; and a computer which can be modified quickly and easily to operate on different type carriers having distinctive operating characteristics, which can be readily adjusted to present any desired glide path stabilized fully in space, and also adjusted to compensate for different hook to eye distances.

In some instances it may be desirable to substitute a solid bar member to represent the glide path rather than the slot cutout 84. This modification is illustrated in FIG. 6. In this construction, a bar member 110 is substituted for the slot cutout 84, and supported by adjusting means to permit positioning to any desired glide path. A channel member 112 is secured rigidly to the rigid member 96 by screws, solder or the like. Bar member 110 is supported to provide three degrees of freedom of movement, as vertical member 82 in the previously described embodiment. One end of bar member 110 is supported from vertical bar 85' by a ball and socket coupling 86'. The other end carries a pin 114 which is adjustable in a slot 116 of a vertical support 118, the latter being slidably engageable in a channel 120 formed along an outer edge of base plate 34. It is thus seen that bar member 110 has the same freedoms of movement and is the full functional counterpart of vertical member 82 and its slot 84 in the FIG. 4 embodiment. In operation, the bar member 110 is positioned between the channel member 112 and the member 96 to define the position of the member 96 regardless of the displacement of the member 72.

Obviously many modifications and variations of the present invention are possible in the light of the above teachings. It is therefore to be understood that within the scope of the appended claims the invention may be practiced otherwise than as specifically described.

What is claimed is:

1. In an optical landing system for assisting the landing of an aircraft on the flight deck of a carrier by displaying a beam of light to indicate a desired glide path, a stabilizing system for said beam of light which can be selectively conditioned to operate from different carriers, comprising: a base plate representative of a reference plane on the carrier; a first member representative of the desired glide path; mounting means supporting said first member to provide at least two degrees of freedom of movement with respect to said base plate; means enabling the setting of said first member about an axis parallel to said base plate to an angle representative of the glide path elevation angle; means enabling the further setting of said first member about an axis perpendicular to said base plate to an angle represensative of the angle the carrier flight deck assumes with respect to the reference plane for that carrier; a second member operatively associated to said first member; means for positioning said second member in accordance with the actual displacements of said carrier; means for comparing the setting of said first member with the position of said second member; and means for correcting the position of said beam of light in accordance with said comparison.

2. In an optical landing system for assisting the landing of an aircraft on the flight deck of a carrier by displaying a beam of light to indicate a desired glide path, a stabilizing system for said beam of light which can be selectively conditioned to operate with respect to different aircraft, comprising: a base plate representative of a reference plane on the carrier; a first member representative of the desired glide path; mounting means supporting said first member to provide at least two degrees of freedom of movement with respect to said base plate; means enabling the setting of said first member about an axis parallel to said base plate to an angle representative of the glide path elevation angle; means enabling the further setting of said first member toward and away from said base plate to represent the hook-to-eye distance for that aircraft; a second member operatively associated to said first member; means for positioning said second member in accordance with the actual displacements of said carrier; means for comparing the setting of said first member with the position of said second member; and means for correcting the position of said beam of light in accordance with said comparison.

3. In an optical landing system for assisting the landing of an aircraft on the flight deck of a carrier by displaying a beam of light to indicate a desired glide path, a stabilizing system for said beam of light which can be selectively conditioned to operate from different carriers and with respect to different aircraft, comprising: a base plate representative of a reference plane on the carrier; a first member representative of the desired glide path; mounting means supporting said first member to provide at least three degrees of freedom of movement with respect to said base plate; means enabling the setting of said first member about an axis parallel to said base plate to an angle representative of the glide path elevation angle; means enabling the further setting of said first member about an axis perpendicular to said base plate to an angle representative of the angle the carrier flight deck assumes with respect to the reference plane for that carrier; means enabling the further setting of said first member toward and away from said base plate to represent the hook-to-eye distance for that aircraft; a second member operatively associated to said first member; means for positioning said second member in accordance with the roll, pitch, heave and yaw displacements of said carrier; means for comparing the setting of said first member with the position of said second member; and means for correcting the position of said beam of light in accordance with said comparison.

4. In an optical landing system for assisting a pilot in the landing of an aircraft on the flight deck of a carrier by displaying a beam of light to indicate a desired glide path, a stabilizing system for said beam of light, comprising: a base plate representative of a reference plane on the carrier; a first member representative of the desired glide path; mounting means supporting said first member in operative relationship with respect to said base plate; means enabling the setting of said first member to an angle with respect to said base plate representative of the glide path elevation angle with respect to the reference plane on the carrier; a fan shaped element representing the fan shaped beam of light, said fan shaped element being settable by said first member in accordance with the desired glide path; a second member operatively associated to said first member; means for positioning said second member in accordance with the displacements of said carrier which tend to unstabilize said beam of light; means including said fan shaped element for comparing the setting of said first member with the position of said second member; and means for stabilizing said beam of light in accordance with said comparison.

5. In an optical landing system for assisting a pilot in the landing of an aircraft on the flight deck of a carrier by displaying a beam of light to indicate a desired glide path, a stabilizing system for said beam of light, comprising: a relatively horizontal base plate representative of a reference plane on the carrier, said base plate being formed with a cutout; a vertical plate formed with a slot representative of the desired glide path; mounting means supporting said vertical plate in said cutout of said base plate; means enabling the setting of said vertical plate so that said slot assumes an angle with respect to said base plate representative of the glide path elevation angle with respect to the reference plane on the carrier; an element fan shaped in a plane perpendicular to said vertical plate to represent the fan shaped beam of light, said fan shaped element being receivable in said slot of said vertical plate and thereby being settable in accordance with the desired glide path; a member operatively associated to said vertical plate; means for positioning said member in accordance with the displacements of said carrier which tend to unstabilize said beam of light; means including said fan shaped element for comparing the setting of said vertical plate with the position of said member; and means for stabilizing said beam of light in accordance with said comparison.

6. In an optical landing system for assisting a pilot in the landing of an aircraft on the flight deck of a carrier by displaying a beam of light to indicate a desired glide path, a stabilizing system for said beam of light, comprising: a relatively horizontal base plate representative of a reference plane on the carrier, said base plate being formed with a channel along an outer edge thereof; a bar representative of the desired glide path; mounting means supporting said bar in said channel of said base plate; means enabling the setting of said bar to an angle with respect to said base plate representative of the glide path elevation angle with respect to the reference plane on the carrier; a fan shaped element to represent the fan shaped beam of light, said fan shaped element being settable by said bar in accordance with the desired glide path; a member operatively associated to said bar; means for positioning said member in accordance with the displacements of said carrier which tend to unstabilize said beam of light; means including said fan shaped element for comparing the setting of said bar with the position of said member; and means for stabilizing said beam of light in accordance with said comparison.

7. In an optical landing system for assisting a pilot in the landing of an aircraft on the flight deck of a carrier by displaying a beam of light to indicate a desired glide path, a stabilizing system for said beam of light which can be selectively conditioned to operate with respect to different aircraft, comprising: a base plate representative of a reference plane on the carrier; a first member representative of the desired glide path; mounting means supporting said first member to provide at least two degrees of freedom of movement with respect to said base plate; means enabling the setting of said first member to an angle with respect to said base plate representative of the glide path elevation angle with respect to the reference plane on the carrier; means enabling the setting of said first member toward and away from said base plate to represent the hook-to-eye distance for that aircraft; a fan shaped element to represent the fan shaped beam of light, said fan shaped element being settable by said first member in accordance with the desired glide path; a second member operatively associated to said first member; means for positioning said second member in accordance with the displacements of said carrier which tend to unstabilize said beam of light; means including said fan-shaped element for comparing the setting of said first member with the position of said second member; and means for stabilizing said beam of light in accordance with said comparison.

8. In an optical landing system for assisting a pilot in the landing of an aircraft on the flight deck of a carrier by displaying a beam of light to indicate a desired glide path, a stabilizing system for said beam of light which can be selectively conditioned to operate from different carriers; comprising: a base plate representative of a reference plane on the carrier; a first member representative of the desired glide path; mounting means supporting said first member to provide at least two degrees of freedom of movement with respect to said base plate; means enabling the setting of said first member to an angle with respect to said base plate representative of the glide path elevation angle with respect to the reference plane on the carrier; means enabling the setting of said first member about an axis perpendicular to said plate to an angle representative of the angle the carrier flight deck assumes with respect to the reference plane for that carrier; a fan shaped element representative of the fan shaped beam of light, said fan shaped element being settable by said first member in accordance with the desired glide path; a second member operatively associated to said first member; means for positioning said second member in accordance with the displacements of said carrier which tend to unstabilize said beam of light; means including said fan shaped element for comparing the setting of said first member with the position of said second member; and means for stabilizing said beam of light in accordance with said comparison.

9. In an optical landing system for assisting a pilot in the landing of an aircraft on the flight deck of a carrier by displaying a beam of light to indicate a desired blade path, a stabilizing system for said beam of light which can be selectively conditioned to operate from different carriers and with respect to different aircraft, comprising: a base plate representative of a reference plane on the carrier; a first member representative of the desired glide path; mounting means supporting said first member to provide at least three degrees of freedom of movement with respect to said base plate; means enabling the setting of said first member to an angle with respect to said base plate representative of the glide path elevation angle with respect to the reference plane on the carrier; means enabling the setting of said first member about an axis perpendicular to said plate to an angle representative of the angle the carrier flight deck assumes with respect to the reference plane for that carrier; means enabling the setting of said first member toward and away from said base plate to represent the hook-to-eye distance for that aircraft; a fan shaped element to represent the fan shaped beam of light, said fan shaped element being settable by said first member in accordance with the desired glide path; a second member operatively associated to said first member; means for positioning said second member in accordance with the roll, pitch, heave and yaw displacements of said carrier which tend to unstabilize said beam of light; means including said fan shaped element for comparing the setting of said first member with the position of said second member; and means for stabilizing said beam of light in accordance with said comparison.

References Cited in the file of this patent

UNITED STATES PATENTS

| | | |
|---|---|---|
| 2,439,846 | Dicke | Apr. 20, 1948 |
| 2,522,029 | Field | Sept. 12, 1950 |
| 2,581,358 | Busignies | Jan. 8, 1952 |
| 2,762,992 | Schmid | Sept. 11, 1956 |
| 2,784,925 | Goodhart | Mar. 12, 1957 |
| 2,989,672 | Agins | June 20, 1961 |

FOREIGN PATENTS

| | | |
|---|---|---|
| 460,758 | Canada | Nov. 1, 1949 |